(12) United States Patent
Schlicht et al.

(10) Patent No.: US 11,487,295 B2
(45) Date of Patent: Nov. 1, 2022

(54) METHOD AND DEVICE FOR ABSTRACTING A DATA RECORD

(71) Applicant: Volkswagen Aktiengesellschaft, Wolfsburg (DE)

(72) Inventors: Peter Schlicht, Wolfsburg (DE); Fabian Hüger, Wolfenbüttel (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 457 days.

(21) Appl. No.: 16/659,727

(22) Filed: Oct. 22, 2019

(65) Prior Publication Data
US 2020/0125107 A1  Apr. 23, 2020

(30) Foreign Application Priority Data
Oct. 23, 2018 (DE) .................. 10 2018 218 098.9

(51) Int. Cl.
*G05D 1/02* (2020.01)
*G06N 20/20* (2019.01)
(Continued)

(52) U.S. Cl.
CPC .......... *G05D 1/0221* (2013.01); *G06N 3/0454* (2013.01); *G06N 3/08* (2013.01); *G06N 20/20* (2019.01); *G05D 2201/0213* (2013.01)

(58) Field of Classification Search
CPC .......... B60W 2556/25; B60W 60/0027; G05D 1/0221; G05D 2201/0213; G06F 21/6218;
(Continued)

(56) References Cited

U.S. PATENT DOCUMENTS 10,489,792 B2 * 11/2019 Hackman .............. G06N 3/0454
10,497,004 B2 * 12/2019 Shaev ................... H04L 67/148
(Continued)

FOREIGN PATENT DOCUMENTS

DE   102013114239 A1   7/2014  ............. G01C 21/34
DE   112012004781 T5   8/2014  ............... G08G 1/01
(Continued)

OTHER PUBLICATIONS

Aleksei et al. ("Generating Differentially Private Datasets Using GANs", Published: Mar. 8, 2018 (Year: 2018).*
(Continued)

*Primary Examiner* — Babar Sarwar
(74) *Attorney, Agent, or Firm* — Slayden Grubert Beard PLLC

(57) ABSTRACT

The invention relates to a method for abstracting a data record, wherein the data record is provided for machine learning at least one function, comprising the following steps: Training a complex neural network structure comprising different neural networks in the at least one function by way of machine learning based on the data record by means of a machine learning control apparatus, wherein the neural networks and the complex neural network structure are optimized with respect to maximum representativity of the data record, providing the trained complex neural network structure in the form of a data-record-specific knowledge module so that knowledge contained in the data record can be further used in a manner compliant with data protection. The invention further relates to an associated device.

19 Claims, 1 Drawing Sheet

(51) Int. Cl.
*G06N 3/04* (2006.01)
*G06N 3/08* (2006.01)

(58) Field of Classification Search
CPC .... G06N 20/20; G06N 3/0427; G06N 3/0454; G06N 3/08; G06N 3/088; G06N 5/02; G08G 1/01; G08G 1/16
See application file for complete search history.

(56) References Cited

U.S. PATENT DOCUMENTS

| | | | |
|---|---|---|---|
| 10,627,820 B1* | 4/2020 | Abeloe | G10L 13/00 |
| 10,733,614 B2* | 8/2020 | Sapoznik | H04L 67/20 |
| 10,747,957 B2* | 8/2020 | Wohlwend | G10L 15/22 |
| 10,802,488 B1* | 10/2020 | Abeloe | G05D 1/0088 |
| 10,802,489 B1* | 10/2020 | Abeloe | G10L 15/16 |
| 10,817,650 B2* | 10/2020 | McCann | G06F 40/205 |
| 10,831,691 B1* | 11/2020 | Dazzi | G06F 13/4027 |
| 10,878,320 B2* | 12/2020 | Wierzynski | G06N 3/084 |
| 10,911,266 B2* | 2/2021 | Cao | H04L 25/0224 |
| 10,956,807 B1* | 3/2021 | Abeloe | G06N 3/063 |
| 11,077,842 B2* | 8/2021 | Dalum | B60W 10/18 |
| 11,130,501 B2* | 9/2021 | Liu | B60W 60/0053 |
| 11,216,510 B2* | 1/2022 | Jiang | G06N 3/0454 |
| 11,225,240 B2* | 1/2022 | Dalum | B60K 25/02 |
| 11,250,369 B2* | 2/2022 | Tilton | H04L 67/20 |
| 2013/0134730 A1 | 5/2013 | Ricci | 296/24.34 |
| 2014/0214322 A1 | 7/2014 | Tsimhoni et al. | 701/534 |
| 2016/0007214 A1 | 1/2016 | Ekiz et al. | 370/329 |
| 2017/0305437 A1 | 10/2017 | Onorato et al. | |
| 2019/0258243 A1 | 8/2019 | Meier | |
| 2020/0151560 A1* | 5/2020 | Song | G06N 5/022 |

FOREIGN PATENT DOCUMENTS

| | | | | |
|---|---|---|---|---|
| DE | 102014212989 A1 | 1/2016 | | H04W 4/04 |
| DE | 102015211266 A1 | 12/2016 | | G06Q 50/10 |
| DE | 102017108824 A1 | 10/2017 | | G07C 5/08 |
| WO | 2018/073230 A1 | 4/2018 | | G06F 17/50 |

OTHER PUBLICATIONS

Nicolas et al. ("Scalable Private Learning With Pate", Published: Feb. 24, 2018 (Year: 2018).*

Ho et al. ("Security and Privacy Issues in Deep Learning", Published: Jul. 31, 2018 (Year: 2018).*

Triastcyn, Aleksei et al., "Generating Differentially Private Datasets Using GANs," URL: https://arxiv:1803.03148v1, 12 pages, Mar. 8, 2018.

Abadi, Martin et al., "Deep Learning with Differential Privacy," In arXiv e-prints, URL: https://arxiv.org/abs/1607.00133v2.pdf, 14 pages, Oct. 24, 2016.

Papernot, Nicolas et al., "Semi-Supervised Knowledge Transfer for Deep Learning from Private Training Data," In arXiv e-prints, URL: https://arxiv.org/pdf/1610.05755v4.pdf, 16 pages, Mar. 7, 2017.

Papernot, Nicolas et al., "Scalable Private Learning with PATE," In arXiv e-prints, URL: https://arxiv.org/pdf/1802.08908v1.pdf, 34 pages, Feb. 24, 2018.

Triastcyn, Aleksei et al., "Generating Artificial Data for Private Deep Learning," In arXiv e-prints, URL: https://arxiv.org/abs/1803.03148v2, 10 pages, Jun. 7, 2018.

Bae, Ho et al., "Security in Privacy Issues in Deep Learning," In arXiv e-prints, URL: https://arxiv.org/pdf/1807.11655vl.pdf, 21 pages, Jul. 31, 2018.

Al-Rubaie, Mohammad et al., "Privacy-Preserving Machine Learning: Threats and Solutions," In IEEE Security and Privacy Magazine, URL: https://arxiv.org/ftp/arxiv/papers/1804/1804.11238.pdf, 18 pages, Apr. 11, 2019.

German Search Report, Application No. 102018218098.9, 10 pages, dated Sep. 11, 2019.

* cited by examiner

METHOD AND DEVICE FOR ABSTRACTING A DATA RECORD

CROSS-REFERENCE TO RELATED APPLICATIONS

This application claims priority to German Patent Application No. 10 2018 218 098.9, filed on Oct. 23, 2018 with the German Patent and Trademark Office. The contents of the aforesaid patent application are incorporated herein for all purposes.

TECHNICAL FIELD

The invention relates to a method and a device for abstracting a data record.

BACKGROUND

From improvements in the fields of artificial intelligence and machine learning, it has become possible in recent years to teach complex functions, such as perceptual functions using extensive data records. In the field of vehicle technology, functions are increasingly being used that are generated with the assistance of machine learning. In this case, deep learning methods are used in particular. To teach the deep neural networks needed to execute these functions, large data records of training data are needed. Such training data can for example be voice, text or image and video data as well as other vehicle sensor data (from an interior or environment of the vehicle, data detected by apps or user input on websites, etc.). These data are subject to legal data protection provisions (see the General Data Protection Regulation (GDPR)). Consequently, in line with data protection, the training data must be deleted after the purpose for acquiring data has expired.

It is, however, desirable to retain the knowledge collected in the large training data records to further develop functions.

It is known to render, or respectively retain, this knowledge available in the training data as usable by anonymizing the training data by removing all personal details, or by describing the training data using heuristics or statistics.

SUMMARY

An object exists to provide a method and a device for abstracting a data record in which the knowledge available in the data record can be saved and provided in a manner compliant with data protection even after the original data record has been deleted.

This object is solved according to the invention by means of a method and a device according to the independent claims. Embodiments of the invention are discussed in the following description and in the dependent claims.

In one aspect, a method for abstracting a data record is provided, wherein the data record is provided for machine learning at least one function, comprising the following steps: training a complex neural network structure comprising different, e.g., deep neural networks in the at least one function by way of machine learning based on the data record using a machine learning control apparatus, wherein the, e.g., deep neural networks and the complex neural network structure are optimized with respect to maximum representativity of the data record, providing the trained complex neural network structure in the form of a data-record-specific knowledge module so that knowledge contained in the data record can be further used in a manner compliant with data protection.

In another aspect, a device is provided for abstracting a data record, wherein the data record is provided for machine learning at least one function, comprising a machine learning control apparatus, wherein the machine learning control apparatus is designed to train a complex neural network structure comprising different, in particular deep neural networks in the at least one function by way of machine learning based on the data record using a machine learning control apparatus, wherein the, e.g., deep neural networks and the complex neural network structure are optimized with respect to maximum representativity of the data record, and the trained complex neural network structure is provided in the form of a data-record-specific knowledge module so that knowledge contained in the data record can be further used in a manner compliant with data protection.

Specific details, aspects, features, and advantages of the present disclosure will in the following be described using various embodiments.

DETAILED DESCRIPTION

Figure 1:
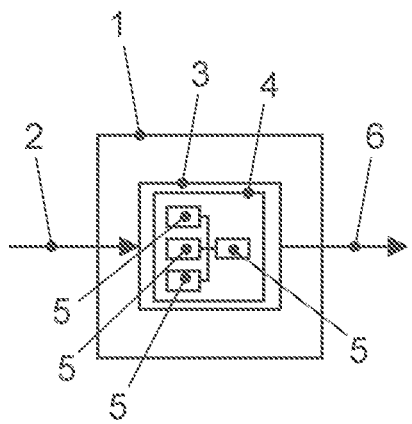
FIG. 1 shows a schematic representation of an embodiment of the device for abstracting a data record.

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In one aspect, a method for abstracting a data record is provided, wherein the data record is provided for machine learning at least one function, comprising the following steps: Training a complex neural network structure comprising different, in particular deep neural networks in the at least one function by way of machine learning based on the data record by means of a machine learning control apparatus, wherein the in particular deep neural networks and the complex neural network structure are optimized with respect to maximum representativity of the data record, providing the trained complex neural network structure in the form of a data-record-specific knowledge module so that knowledge contained in the data record can be further used in a manner compliant with data protection.

Furthermore and in another aspect, a device is provided for abstracting a data record, wherein the data record is provided for machine learning at least one function, comprising a machine learning control apparatus, wherein the machine learning control apparatus is designed to train a complex neural network structure comprising different, in particular deep neural networks in the at least one function by way of machine learning based on the data record by means of a machine learning control apparatus, wherein the in particular deep neural networks and the complex neural network structure are optimized with respect to maximum representativity of the data record, and the trained complex neural network structure is provided in the form of a data-record-specific knowledge module so that knowledge contained in the data record can be further used in a manner compliant with data protection.

A basic concept is to obtain the knowledge contained in the data record used for training through a complex neural network structure that was trained in the data record, wherein in particular deep neural networks comprised by the complex neural network structure and the complex neural network structure are optimized for maximum representativity of the data record so that the conceptual knowledge contained in the original data record is comprehensively retained even after deleting the original data record without allowing the data to be restored, which would be problematic in terms of data protection law. Expressed otherwise, the complex neural network structure serves as a memory for the knowledge available in the data record after training. The complex neural network structure is trained in at least one function, wherein this is accomplished on the basis of the data record. After training, the trained complex neural network structure is provided in the form of a data-record-specific knowledge module. This knowledge module is for example provided as a corresponding data record and/or program code in digital form.

A benefit exists in that the complex neural network structure provided in the form of the knowledge module still contains the knowledge available in the originally used data record, however in abstract form without any personal data. The knowledge module therefore contains the knowledge available in the data record in a manner compliant with data protection. The original data record of the training data can therefore be deleted without losing the knowledge contained therein. Reuse of the knowledge module is therefore innocuous in terms of data protection law.

Another benefit is that the knowledge module comprises significantly less data in comparison to the original data record, and therefore requires less memory. Memory can therefore be saved despite the ability to still render the knowledge available in the data record usable.

The data record may in some embodiments comprise training data, i.e., data that are provided with additional labels (labeled data) that serve to train a neural network. Such a label is for example the information that a specific class of objects (such as a bicycle) is depicted in images provided in the data record. The data can moreover be described (tagged) by contextual information. Such information describes less the content of the data in the sense of a ground truth, i.e., the outcome variable for a machine learning process; instead, this information is a meta description for associating the data with a context. Examples of this are geocoordinates, a time, a current driving maneuver, etc.

Representativity in this context means, e.g., that the knowledge saved in the complex neural network structure after training is representative of the data records used in training, i.e., the saved knowledge of this data record can be depicted in as representative a manner as possible when the data record is considered a basic population.

It may for example be provided that the complex neural network structure is trained for a plurality of functions (multitask learning). In this manner, a complex neural network structure with maximum potency can be created. Even highly complex tasks with a plurality of necessary functions can thereby be solved using the complex neural network structure, or respectively the knowledge available in an associated data record can be rendered usable in a manner compliant with data protection.

In some embodiments, it may be provided that all of the neural networks comprised by the complex neural network structure during training can be trained, or respectively, the individual weighting within the neural networks can be changed. However, it may also be provided in some embodiments that individual neural networks are not trained, or respectively changed; instead the training only relates to part of the neural networks, and/or only occurs on a subordinate level within the complex neural network structure. It may furthermore be provided that publicly-available neural networks, or respectively corresponding software packages are used for certain functions.

Some embodiments provide that a formalized description of the data record represented by the trained complex neural network structure is additionally provided in the knowledge module. The formalized description comprises, e.g., an automatically created and machine-readable description of the content of the original training data in the data record, for example a distribution of scenarios and context variables, i.e., objects available in the data, weather, light conditions, vehicle properties, etc. For example, the formalized description can comprise information on traffic infrastructure, driving conditions (such as environmental light intensity, intensity of precipitation, environmental temperature, road slickness), dynamic objects (such as identified vehicles or pedestrians), and/or the functioning of driver assist systems, and/or the occurrence of a predefined driving scenario.

Some embodiments provide that at least one statistic on the data record represented by the trained complex neural network structure is additionally provided in the knowledge module. This can for example be information on an amount and/or a distribution of the data, and/or information on a sensor configuration and/or a sensor position, and/or information on an amount of tasks. The amount of tasks can in this case comprise in particular the following tasks: a semantic segmentation, a 2-D object classification and location, a 3-D object classification and location, an object prediction, a detection of free space, an assessment of criticality, a weather classification, a friction coefficient prediction, a landmark recognition, a trajectory prediction of one's own or another vehicle, a lane recognition, and/or an estimation of depth.

Some embodiments provide that at least one meta-parameter on the trained complex neural network structure is also provided in the knowledge module. Such a meta-parameter describes for example a type and/or a structure of the individual neural networks in the complex neural network structure, or respectively in the knowledge module, and/or a type and/or a structure of the complex neural networks.

Some embodiments provide that at least one quality rating characterizing the trained complex neural network structure and/or the data record represented by the trained complex neural network structure is also provided in the knowledge module. Such a quality rating may for example be a quality of the knowledge module with respect to all of the functions implemented therein, such as a success rate of the knowledge module. A quality rating may also be a quality of one of the at least one function, such as a success rate in object recognition. A quality rating may also refer to nonfunctional properties such as a data record coverage quality, or a robustness of at least one function trained in the data record.

It may in some embodiments also be provided that the knowledge module provides part or all of the aforementioned information (formalized description, meta-parameter, quality rating, etc.).

Some embodiments provide that the complex network structure is at least partially formed by stacking and/or ensembling at least some of the neural networks. Expressed more simple, in stacking, several different neural networks are used to solve the same task at the same time. On a level subordinate to these several neural networks, another neural network then determines in which instances which of the several neural networks makes the best decision. In ensembling, the results of several neural networks are considered combined with each other as an ensemble. The benefit of using stacking and ensemble procedures is that higher success rates are achievable in comparison to using individual neural networks when implementing the functions such as object recognition.

Some embodiments provide that an evaluation of at least one additional function and/or an analysis of differences between the data record and another data record are performed on the basis of the provided data-record-specific knowledge module. Different knowledge modules yield specific knowledge abstractions for different data records. The knowledge modules, or respectively the knowledge abstractions contained therein, can for example be used to evaluate new functions with respect to stability and/or divergence for the same tasks. Furthermore, an analysis of the differences between individual data records can be performed by comparing the associated knowledge modules with each other.

Some embodiments provide that at least one additional neural network is initialized and/or trained on the basis of the provided knowledge module. The provided knowledge module makes it possible to provide the knowledge available in the original data record in an abstract way compliant with data protection and to render it usable for training the additional neural network, or another complex neural network structure. The knowledge module can be used to initialize the additional neural network, or for training in the form of a student-teacher method. In the student-teacher method, labeled training data are not used to train the additional neural network; instead, the results of the knowledge module are used. Expressed otherwise, the complex neural network structure of the knowledge module and the additional neural network to be trained are supplied with the same input data, wherein the additional neural network to be trained is trained using the output data from the complex neural network structure of the knowledge module. Since the knowledge available in the original data record is still available in the knowledge module, the additional neural network is approximately trained in the same way as would be possible with the original data record.

Some embodiments provide in particular that the at least one additional neural network is designed less complex in comparison with the complex neural network structure.

Some embodiments provide that the complex neural network structure is trained to execute all of the perceptual functions needed for automated driving of a motor vehicle based on corresponding sensor data provided as a data record. This means, e.g., that the perceptual functions to be trained retain the sensor data (such as camera data, i.e., image and/or video data, and/or radar data, and/or lidar data) as input data, and supply data at the output that originate from all of the perceptual functions. These perceptual functions relate in particular, but not limited to:
  semantic segmenting,
  object recognition (such as a car, road sign, pedestrian, stoplight, etc.) with a 2-D bounding box,
  object recognition and object localization (such as a car, road sign, pedestrian, stoplight, etc.) with a 3-D bounding box,
  open space recognition (segmenting of travelable areas or regions in the surroundings),
  lane recognition,
  intention recognition (such as a pose and/or intention of road users),
  prediction of behavior of the dedicated vehicle and behavior of other road users.

The complex neural network structure which is then provided as a knowledge module in these embodiments has maximum potency and comprises the entire knowledge from the data record.

A benefit of these embodiments is that newly developed perceptual functions can also be tested, analyzed and taught without the original data record.

However it can also be provided that only individual perceptual functions or only part of all necessary perceptual functions are implemented in the complex neural network structure, or respectively the knowledge module.

Parts of the device, such as, e.g., in particular the machine learning control apparatus, may be designed individually or assembled as a combination of hardware and software, for example as programmed code that is executed in a microcontroller or a microprocessor. Furthermore, it is also possible for the machine learning control apparatus to be designed entirely or partially as a field-programmable gate array (FPGA), or as an application-specific integrated circuit (ASIC).

In the following, the invention will be explained in greater detail based on further exemplary embodiments and with reference to the drawings.

FIG. 1 shows a schematic representation of an embodiment of the device 1 for abstracting a data record 2. The device 1 comprises a machine learning control apparatus 3.

The device 1 is provided with the data record 2. The data record 2 can for example comprise image data, and/or video data, and/or sensor data, wherein the data comprised by the data record are labeled (labeled data), i.e., the data in the data record are labeled with additional information that indicates what is contained in the data. The data can moreover be described (tagged) by contextual information. Such information describes less the content of the data in the sense of a ground truth, i.e., the outcome variable for a machine learning process; instead, this information is a meta description for associating the data with a context. Examples of this are geocoordinates, a time, a current driving maneuver, etc. The data record 2 is supplied to the machine learning control apparatus 3.

The machine learning control apparatus 3 learns a complex neural network structure 4 for least one function by way of machine learning based on the data record 2. The complex neural network structure 4 comprises different neural networks 5. In training, the neural networks 5 and the complex neural network structure 4 are optimized with respect to maximum representativity of the data record 2. This step makes it possible to representatively reproduce the knowledge available in the data record 2 after the end of training by means of the complex neural network structure 4. All personal data that were contained in the data record 2 are in contrast no longer available in the trained complex neural network structure 4 so that the knowledge is retained in a manner compliant with data protection.

The machine learning control apparatus 3 then provides the trained complex neural network structure 4 in the form of a data-record-specific knowledge module 6. This knowledge module 6 is in particular provided in the form of a data package which contains information on the structure and the parameters, or respectively weightings of the complex neural network structure 4 as well as the neural networks 5.

The provided knowledge module 6 can then be used to render usable the knowledge available in the original data record 2 in a manner compliant with data protection, for example to train or test another neural network.

One embodiment provides that the complex neural network structure 4 is trained to execute all of the perceptual functions needed for automated driving of a motor vehicle based on corresponding sensor data provided as a data record 2. This means in particular that the perceptual functions to be trained retain the sensor data (such as camera data, i.e., image and/or video data, and/or radar data, and/or lidar data) as input data, and supply data at the output that originate from all of the perceptual functions. These perceptual functions relate in particular to:
- semantic segmenting,
- object recognition (such as a car, road sign, pedestrian, stoplight, etc.) with a 2-D bounding box,
- object recognition and object localization (such as a car, road sign, pedestrian, stoplight, etc.) with a 3-D bounding box,
- open space recognition (segmenting of travelable areas or regions in the surroundings),
- lane recognition,
- intention recognition (such as a pose and/or intention of road users),
- prediction of behavior of the dedicated vehicle and behavior of other road users.

The complex neural network structure 4 which is then provided as a knowledge module 6 in this embodiment has maximum potency and comprises the entire knowledge from the data record 2.

However, it can also be provided that only individual perceptual functions or only part of all perceptual functions necessary for automated driving are implemented in the complex neural network structure 4.

Figure 2:
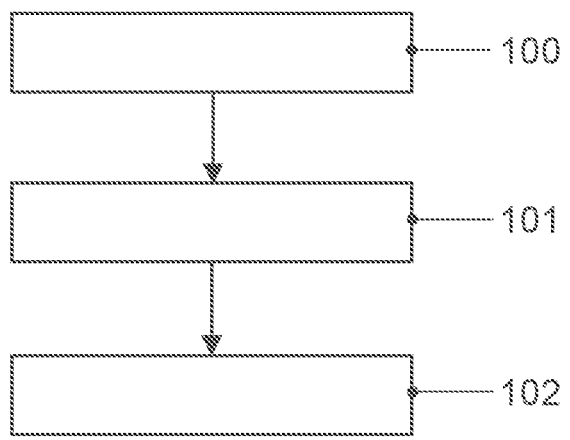
FIG. 2 shows a schematic representation of an embodiment of the method for abstracting a data record.

FIG. 2 shows a schematic representation of an embodiment of the method for abstracting a data record.

In method step 100, a data record is provided for machine learning at least one function and is received by a machine learning control apparatus.

In method step 101, a complex neural network structure is trained in the at least one function by way of machine learning based on the received data record by means of the machine learning control apparatus, wherein the neural networks and the complex neural network structure are optimized with respect to maximum representativity of the data record. The complex neural network structure comprises different neural networks and is for example formed by means of stacking and/or ensembling.

In method step 102, the trained complex neural network structure is provided in the form of a data-record-specific knowledge module. In the knowledge module, the complex neural network structure is saved for example as corresponding structure data, and/or parameters, or respectively weighting data.

The knowledge module is for example provided in the form of a data package so that it can be easily further processed. By providing the knowledge module, the knowledge contained in the data record can be further used in a manner compliant with data protection.

Furthermore, it can be provided that a formalized description of the data record represented by the trained complex neural network structure is additionally provided in the knowledge module.

It can also be provided that at least one statistic on the data record represented by the trained complex neural network structure is additionally provided in the knowledge module.

Furthermore it can be provided that at least one meta-parameter on the trained complex neural network structure is additionally provided in the knowledge module.

Moreover it can be provided that at least one quality rating characterizing the trained complex neural network structure and/or the data record represented by the trained complex neural network structure is also provided in the knowledge module.

It may be provided that the complex neural network structure is at least partially formed by stacking and/or ensembling at least some of the neural networks.

Furthermore it can be provided that an evaluation of at least one additional function and/or an analysis of differences between the data record and another data record are performed on the basis of the provided data-record-specific knowledge module.

It may be provided that at least one additional neural network is initialized and/or trained on the basis of the provided knowledge module. This can for example be accomplished by means of a student-teacher method.

Another embodiment provides that the at least one additional neural network is designed less complex in comparison with the complex neural network structure.

LIST OF REFERENCE SIGNS

1 Device
2 Data record
3 Machine learning control apparatus
4 Complex neural network structure
5 Neural network
6 Knowledge module
100-102 Method steps The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A method for abstracting a data record, wherein the data record is provided for machine learning at least one function, comprising:
- training a complex neural network structure comprising different neural networks in the at least one function based on the data record using a machine learning control apparatus, wherein at least one of the neural networks and the complex neural network structure are optimized with respect to maximum representativity of the data record;
- providing the trained complex neural network structure in the form of a data-record-specific knowledge data package so that knowledge contained in the data record is retained in the data package without personal data from the data record; wherein
- the knowledge data package comprises a formalized description of the data record represented by the trained complex neural network structure; and wherein the formalized description comprises an automatically created and machine-readable description of the content of the data record.

2. The method according to claim 1, wherein at least one statistic on the data record represented by the trained complex neural network structure is additionally provided in the knowledge data package.

3. The method according to claim 2, wherein at least one meta-parameter on the trained complex neural network structure is additionally provided in the knowledge data package.

4. The method according to claim 2, wherein at least one quality rating characterizing the trained complex neural network structure and/or the data record represented by the trained complex neural network structure is additionally provided in the knowledge data package.

5. The method according to claim 2, wherein the complex neural network structure is at least partially formed by stacking and/or ensembling at least some of the neural networks.

6. The method according to claim 1, wherein at least one meta-parameter on the trained complex neural network structure is additionally provided in the knowledge data package.

7. The method according to claim 6, wherein at least one quality rating characterizing the trained complex neural network structure and/or the data record represented by the trained complex neural network structure is additionally provided in the knowledge data package.

8. The method according to claim 6, wherein the complex neural network structure is at least partially formed by stacking and/or ensembling at least some of the neural networks.

9. The method according to claim 1, wherein at least one quality rating characterizing the trained complex neural network structure and/or the data record represented by the trained complex neural network structure is additionally provided in the knowledge data package.

10. The method according to claim 9, wherein the complex neural network structure is at least partially formed by stacking and/or ensembling at least some of the neural networks.

11. The method according to claim 1, wherein the complex neural network structure is at least partially formed by stacking and/or ensembling at least some of the neural networks.

12. The method according to claim 1, wherein an evaluation of at least one additional function and/or an analysis of differences between the data record and another data record are performed on the basis of the provided data-record-specific knowledge data package.

13. The method according to claim 1, wherein at least one additional neural network is initialized and/or trained on the basis of the provided knowledge data package.

14. The method according to claim 1, wherein the complex neural network structure is trained to execute all of the perceptual functions needed for automated driving of a motor vehicle based on corresponding sensor data provided as a data record.

15. The method according to claim 1, wherein at least one statistic on the data record represented by the trained complex neural network structure is additionally provided in the knowledge data package.

16. The method according to claim 1, wherein at least one meta-parameter on the trained complex neural network structure is additionally provided in the knowledge data package.

17. The method according to claim 1, wherein at least one quality rating characterizing the trained complex neural network structure and/or the data record represented by the trained complex neural network structure is additionally provided in the knowledge data package.

18. The method according to claim 1, wherein the complex neural network structure is at least partially formed by stacking and/or ensembling at least some of the neural networks.

19. A device for abstracting a data record, wherein the data record is provided for machine learning at least one function, comprising: a machine learning control apparatus, wherein the machine learning control apparatus is designed to train a complex neural network structure comprising different neural networks in at least one function based on the data record using a machine learning control apparatus, wherein at least one of the neural networks and the complex neural network structure are optimized with respect to maximum representativity of the data record, and the trained complex neural network structure is provided in the form of a data-record-specific knowledge data package so that knowledge contained in the data record is retained in the data package without personal data from the data record; wherein the knowledge data package comprises a formalized description of the data record represented by the trained complex neural network structure; and wherein the formalized description comprises an automatically created and machine-readable description of the content of the data record.

* * * * *